United States Patent [19]
Inoue et al.

[11] Patent Number: 5,880,799
[45] Date of Patent: Mar. 9, 1999

[54] RESIN BLACK MATRIX FOR LIQUID CRYSTAL DISPLAY DEVICE

[75] Inventors: Keijiro Inoue, Shiga-ken; Fumio Tomita, Hikone; Tetsuya Goto, Otsu, all of Japan

[73] Assignee: Toray Industries, Inc., Tokyo, Japan

[21] Appl. No.: 602,717

[22] PCT Filed: Jun. 21, 1995

[86] PCT No.: PCT/JP95/01248

§ 371 Date: Feb. 21, 1996

§ 102(e) Date: Feb. 21, 1996

[87] PCT Pub. No.: WO95/35525

PCT Pub. Date: Dec. 28, 1995

[30] Foreign Application Priority Data

Jun. 21, 1994 [JP] Japan .................................. 6-138873

[51] Int. Cl.⁶ .................................................. G02F 1/1333
[52] U.S. Cl. ............................................................... 349/110
[58] Field of Search ............................................... 349/110

[56] References Cited

FOREIGN PATENT DOCUMENTS

| | | |
|---|---|---|
| 2-239204 | 9/1990 | Japan . |
| 4-3841 | 1/1992 | Japan . |

OTHER PUBLICATIONS

IBM Technical Disclosure Bulletin, vol. 34, No. 4A, 1 Sep. 1991, pp:122–123, XP000210850 "Black Matrix for LCDS," the whole document.

Database WPI Section Ch. Week 9212, Derwent Publications Ltd., London, GB; Class A26, AN 92–094155, XP002029603 & JP 04 040 420 A (Seiko Epson Corp), 10 Feb. 1992, abstract.
Patent Abstracts of Japan, vol. 11, No. 49 (P–547) & JP 61 215525 A (Matsushita) Abstract.

*Primary Examiner*—William L. Sikes
*Assistant Examiner*—James A. Dudek
*Attorney, Agent, or Firm*—Morrison & Foerster LLP

[57] ABSTRACT

The invention relates to a resin black matrix for liquid crystal display device wherein the black matrix for liquid crystal display device contains dispersed light shading agents, wherein the chromaticity coordinates (x, y) in the XYZ color system of the transmitted and/or reflected light from source C or source F10 relative to the chromaticity coordinates ($x_o$, $y_o$) of said light source is in the relation of $(x-x_o)^2+(y-y_o)^2 \leq 0.01$, and also relates to a resin black matrix for liquid crystal display device wherein the black matrix for liquid crystal display device contains dispersed light shading agents and is provided with a backlighting source, wherein the chromaticity coordinates (x, y) in the XYZ color system of the light that is transmitted through the resin black matrix from said backlighting source relative to the chromaticity coordinates ($x_o$, $y_o$) of said light source is in the relation of $(x-x_o)^2+(y-y_o)^2 \leq 0.01$.

The present invention provides a method wherein the chromaticity coordinates are maintained in a specific range as described above to produce a color filter for liquid crystal display device that has good color characteristics, said color filter serving to produce display devices with high displaying quality.

18 Claims, No Drawings

RESIN BLACK MATRIX FOR LIQUID CRYSTAL DISPLAY DEVICE

TECHNICAL FIELD

The present invention relates to a resin black matrix for color filters used in liquid crystal display devices, and more specifically relates to a resin black matrix for color filters that has high displaying characteristics.

BACKGROUND OF THE INVENTION

Generally, a color filter for liquid crystal display consists of a large number of color triplets, each made up of three color pixels (red, green, and blue), formed on a transparent substrate. To enhance the contrast of the display, these pixels are distributed with specific intervals over a light-shielding region, which is called the black matrix because of its color on the screen.

Most of the conventional color filters use a black matrix produced by the photolithography, and comprise a thin metal film with a fine pattern. The metals used for such black matrices include Cr, Ni, and Al, and the methods used for producing them include such vacuum film forming methods as sputtering and vacuum deposition. To form a fine pattern, the photolithography is used in most cases to form a pattern on photoresist, and this photoresist pattern is then used as etching mask to etch thin metal film. The thin metal film produced by this process has the same fine pattern as that on the photoresist.

The methods for producing pixels include the dyeing of a dyeable medium formed by the photolithography, the use of a photosensitive composition consisting of dispersed pigment, the etching of non-photosensitive composition consisting of dispersed pigment, and the electrodeposition of pigment onto a patterned electrode, as well as such low-cost methods as the formation of colored portions by ink jet or other printers.

SUMMARY OF THE INVENTION

However, a black matrix made of thin metal film requires large costs for the thin metal film forming process, which is responsible for the high prices of color filters. In addition, chrome, which is generally used in thin metal film for black matrices, is high in reflectance, leading to strong reflection from the chrome plane in places where strong light comes in from the surroundings. In particular, the displaying performance may be largely reduced if a color filter is used with a transmission type display device. A method has been proposed wherein a layer of such material as chrome oxide is provided between the chrome layer and the transparent substrate with the aim of reducing the reflectance of the black matrix. This, however, further increases the cost for the black matrix production, and cannot serve for price reduction.

To solve this problem, other methods have been proposed wherein, for example, a black matrix is formed by patterning resin that is colored with a light shading material, followed by the formation of color pixels to produce a color filter. Carbon black, which has good light-shading properties, is generally used as such a light shading material, but it has not been possible to achieve a sufficiently high light-shading performance as compared with thin metal film. As a result, part of the backlight may pass the black matrix and reach the display surface. In addition, the transmitted light from carbon black has a color, and when such colored light reaches the display surface, it will be impossible to show the intended colors, particularly for black or other low-brightness colors. The light shading performance can be enhanced by increasing the thickness of the black matrix, but this will reduce the flatness of the surface, leading to other problems of picture quality deterioration.

The present invention was made in view of these problems and with the object of providing a highly light shading black matrix with achromatic characteristics.

This object of the invention is met by using such a black matrix for liquid crystal display device as described below. Specifically, the invention relates to a resin black matrix for liquid crystal display device wherein the black matrix for liquid crystal display device contains dispersed light shading agents, wherein the chromaticity coordinates (x, y) in the XYZ color system of the transmitted and/or reflected light from source C or source F10 relative to the chromaticity coordinates (xo, yo) of said light source is in the relation of $(x-xo)^2+(y-yo)^2 \leq 0.01$, and also relates to a resin black matrix for liquid crystal display device which contains dispersed light shading agents and has a backlighting source, wherein the chromaticity coordinates (x, y) in the XYZ color system of the light that is transmitted through the resin black matrix from said backlighting source relative to the chromaticity coordinates (xo, yo) of said light source is in the relation of $(x-xo)^2+(y-yo)^2 \leq 0.01$. The invention is described in more detail below.

A color liquid crystal display device as used for the invention is provided with a backlighting source for enhanced visibility and generally uses a trichromatic light source in which energy concentrates at the peak wavelengths for red, blue and green pixels in the transmission spectrum. The invention provides a black matrix for liquid crystal display device, that is made of resin containing dispersed light shading agents, wherein the chromaticity coordinates (x, y) in the XYZ color system of the transmitted and/or reflected light from source C or source F10 relative to the chromaticity coordinates (xo, yo) of said light source is in the relation of $(x-xo)^2+(y-yo)^2 \leq 0.01$, and also provides a black matrix for liquid crystal display device having a backlighting source, wherein the chromaticity coordinates (x, y) in the XYZ color system of the light that is transmitted through the resin black matrix from said backlighting source relative to the chromaticity coordinates (xo, yo) of said light source is in the relation of $(x-xo)^2+(y-yo)^2 \leq 0.01$; desirably, $(x-xo)^2+(y-yo)^2 \leq 0.0025$, more desirably $(x-xo)^2+(y-yo)^2 \leq 0.0004$.

Measuring methods available for the transmitted light and the reflected light include the use of a spectrophotometer or a microspectrophotometer to measure the transmittance and reflectance. From the spectra measured, the reference stimuli X, Y, and Z for the source C or source F10 are calculated to determine the chromaticity coordinates. Some commercially available microspectrophotometers, such as Otsuka Denshi MCPD1000, contains programs for these calculations.

Low in reflectance over the entire range of wavelength and extremely low wavelength dependence of the reflectance, the color of the resin black matrix of the present invention is so-called neutral black (non-colored black).

The trichromatic light source show strong light energy peaks at three specific wavelengths in the visible region (400–700 nm). They are called the dominant wavelengths. The dominant wavelengths are defined as the 10 nm range around the maximum of the blue light energy peak at wavelengths of 400–490 nm, the 10 nm range around the maximum of the green light energy peak at wavelengths of 490–580 nm, and the 10 nm range around the maximum of the red light energy peak at wavelengths of 580–675 nm. Normally, they are the ranges of 440–460 nm, 530–550 nm, and 600–620 nm. The transmittance of a black matrix at each dominant wavelength is defined as the average of measurements at the following three points: highest peak maximum, +10 nm from the maximum, and −10 nm from the maximum. Among the transmittance measurements for each dominant wavelength, the maximum should preferably be not larger than four times the minimum, more desirably not larger than two times the minimum, further desirably not larger than 1.5 times the minimum. If it is larger, the light coming from the trichromatic light source will become colored and cause deterioration in the image quality.

With respect to the light shading performance, a black matrix as used for the invention should preferably be 2.3 or more, more desirably 3.1 or more, still more desirably 3.5 or more, in optical density per $\mu$m of the black matrix thickness in the visible light wavelength range of 430–640 nm. For the purposes of the invention, the light shading performance is defined here as the optical density per $\mu$m of the black matrix thickness in the visible light wavelength range of 430–640 nm. To improve the light shading performance, it is important to enhance the dispersion of the light shading material and the stability of the dispersion of light shading material. The reference color stimuli, or Y in the XYZ color system, of a black matrix in the visible light wavelength range of 400–700 nm should preferably be 0.50 or less, more desirably 0.079 or less, still more desirably 0.025 or less.

First of all, there are no specific limitations on the material for the transparent substrate, and desirable materials include inorganic glass materials such as quartz glass, borosilicate glass, and soda-lime glass with a silica-coated surface, and others such as film and sheets of organic polymer.

Next, available light shading materials for black matrix include carbon black powdered metallic oxides such as titanium oxide, and iron oxide (Black Iron Oxide), as well as powdered metallic sulfides, powdered metals, and mixtures of red, blue and green pigments. Of these, carbon black is particularly high in light shading performance and is particularly desirable. Useful carbon black products include those produced by the contact process, such as channel black, roller black and disk black, those produced by the furnace process, such as gas furnace black and oil furnace black, and those produced by the thermal process, such as thermal black and acetylene black. Of these, channel black, gas furnace black, and oil furnace black are particularly desirable.

Carbon black with small particle diameters, particularly in the range of 5–50 nm in average primary particle diameter, should preferably be used to enhance the light shading performance of a black matrix. Carbon black has the structural feature that fine carbon black powder aggregates to form secondary particles. If the average secondary particle diameter is defined as the average of the diameters of such secondary particles, the carbon black should preferably be dispersed in such a way as to minimize the secondary particle diameter. The secondary particle diameter should preferably be in the range of 6–75 nm, more desirably 7–50 nm, still more desirably 8–30 nm. A larger secondary particle diameter is not desirable because a sufficient light shading performance cannot be achieved. To determine the secondary particle diameter, the carbon black is observed by the transmission electron microscopy etc. and the average particle diameter is measured according to JIS R 6002.

Carbon black with such a small particle diameter normally has a brownish color. Such carbon black should preferably be made achromatic by adding pigments of additive complementary color. A desirable black matrix is polyimide resin that comprises dispersed light shading material containing carbon black and pigments of additive complementary color to the carbon black. The additive complementary color of a brownish color is a bluish or purplish color. Useful pigments of an additive complementary color include blue pigments, violet pigments, and mixtures of blue pigments and violet pigments. When colored resin is to be used, the pigment must have a color that is additive complementary to the mixed color of the resin and the carbon black.

Where the light shading material to be used is a mixture of carbon black and pigments with additive complementary to that carbon black, the content of the carbon black in the light shading material should preferably be 50 wt. % or more, more desirably 60 wt. % or more, still more desirably 70 wt. %.

Major useful pigments are listed below with their color index (CI) numbers. Useful blue pigments include Pigment Blues 15, 15:1, 15:2, 15:3, 15:4, 15:6, 16, 21, 22, 60, and 64, of which Pigment Blues 15, 15:1, 15:2, and 15:6 are particularly desirable. Useful violet pigments include Pigment Violets 19, 23, 29, 31, 32, 33, 36, 37, 39, 43, and 50, of which Pigment Violets 23, 31, 33, 43, and 50 are particularly desirable.

Other pigments such as green pigments, yellow pigments, and orange pigments may be added as required, but their content in the light shading material should preferably be 10 wt. % or less. Addition of larger amounts is not desirable because it may cause deterioration in the light shading performance of the black matrix.

With respect to the light shading performance, a black matrix as used for the invention should preferably be 2.3 or more, more desirably 3.1 or more, still more desirably 4.0 or more, in optical density per $\mu$m of the black matrix thickness in the visible light wavelength range of 430–675 nm. For the purposes of the invention, the light shading performance is defined here as the optical density per $\mu$m of the black matrix thickness in the visible light wavelength range of 430–675 nm. To improve the light shading performance, it is important to enhance the dispersion of the light shading material and the stability of the dispersion of light shading material.

There are no specific limitations on the resins to be used for the black matrix, and a variety of resins can be used. Useful resins include photosensitive and non-photosensitive resins such as epoxy resins, acrylic resins, polyimide resins including polyamide-imide, urethane resins, polyester resins, polyvinyl resins, and dyeable animal protein resins including gelatin. However, such resins preferably be higher in heat resistance than the resins used in the pixels and protection film. Specifically, they should preferably be resistant to temperatures of 250° C. and higher. Of the above resins, polyimide resins are particularly desirable because colored resins are desirable in terms of light shading performance enhancement. There are no specific limitations on the polyimide resins, but particularly desirable ones include those produced by heating, or treating with a catalyst, a polyimide precursor (n=1–2) consisting mainly of structural units as expressed by the following general formula (1). Specifically, a black matrix should preferably be produced by coating with black paste prepared by dispersing a light shading material made of carbon black and other pigments, in a solution of said polyimide precursor.

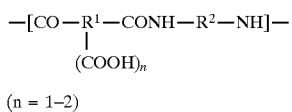

(1)

(n = 1–2)

In said general formula (1), $R^1$ denotes a trivalent or quadrivalent organic group with at least two carbon atoms. In terms of heat resistance, $R^1$ should preferably be a trivalent or quadrivalent organic group that contains a carbocyclic ring, an aromatic ring, or an aromatic heterocyclic ring, and has 6–30 carbon atoms. Such $R^1$ groups include, but not limited to, phenyl, biphenyl, terphenyl, naphthalene, perylene, diphenyl ether, diphenyl sulfone, diphenyl propane, benzophenone, biphenyltrifluoropropane, cyclobutyl, and cyclopentyl.

In the formula, $R^2$ denotes a bivalent organic group with at least two carbon atoms. In terms of heat resistance, $R^2$ should preferably be a bivalent organic group that contains a carbocyclic ring, an aromatic ring, or an aromatic heterocyclic ring, and has 6–30 carbon atoms. Such $R^1$ groups include, but not limited to, phenyl, biphenyl, terphenyl, naphthalene, perylene, diphenyl ether, diphenyl sulfone, diphenyl propane, benzophenone, biphenyltrifluoropropane, diphenylmethane, and dicyclohexylmethane.

In a polymer consisting mainly of said structural unit (1), $R^1$ and $R^2$ separately may be one of such groups as listed above, or may be a copolymer consisting of two or more of them. Furthermore, said polymer should preferably have a copolymer segment that contains bis(3-aminopropyl) tetramethyldisiloxane, which has a siloxane structure, as a diamine component, in order to enhance the adhesion with the substrate, unless it does not reduce the heat resistance.

Specifically, such polymers consisting mainly of structural unit (1) include, but not limited to, polyimide precursors synthesized from one or more carboxylic dianhydrides selected from the group of pyromellitic dianhydride, 3,3',4,4'-benzophenonetetracarboxylic dianhydride, 3,3',4,4'-biphenyltrifluoropropanetetracarboxylic dianhydride, 3,3',4,4'-biphenylsulfonetetracarboxylic dianhydride, and 2,3,5-tricarboxycyclopentylacetic dianhydride, and one or more diamines selected from the group of para-phenylenediamine, 3,3'-diaminophenyl ether, 4,4'-diaminodiphenyl ether, 3,4'-diaminodiphenyl ether, 3,3'- diaminodiphenyl sulfone, 4,4'-diaminodiphenyl sulfone, 4,4'-diaminodicyclohexyl methane, and 4,4'-diaminodiphenyl methane. These polyimide precursors can be synthesized by a known method in which a selected combination of a tetracarboxylic dianhydride and a diamine is reacted in a solvent.

A dicarboxylic dianhydride such as maleic anhydride is normally added in order to stop the polymerization reaction by saturating the molecular ends of the polyimide precursor. The amine group should preferably be at the molecular ends of the polyimide resin in order to achieve better effect by enhancing the dispersion of the light shading material. The proportion of molecular ends with an amine group should preferably be 50%, more desirably 80%, still more desirably 90%. To allow polyimide resin to have an amine group at its molecular ends, the molar amount of the diamine should be slightly larger than that of the tetracarboxylic dianhydride when the polyimide precursor is subjected to the synthetic reaction in a solvent. Specifically, the amount of tetracarboxylic dianhydride should preferably be 100–90 moles, more desirably 98–93 moles, still more desirably 97–95 moles, relative to 100 moles of the diamine.

Among said polyimide resins, those that are high in light absorbance in the visible light wavelength range are preferable because the resultant black matrix will have a higher light shading performance. Specifically, the reference color stimuli, i.e. Y in the XYZ color system, for 2 $\mu$m-thick polyimide film should preferably be 96 or less, more desirably 90 or less, still more desirably 80 or less. These values can be determined from light transmittance spectra of polyimide film for visible light with a wavelength of 400–700 nm. Concerning the tetracarboxylic dianhydride, for example, the acid dianhydride group should be as high as possible in an electron affinity. Thus, useful ones include ketone type groups such as benzophenone, ether type groups such as diphenyl ether, phenyl-containing groups, and sulfone-containing groups such as diphenyl sulfone. Specifically, they include pyromellitic dianhydride, and 3,3', 4,4'-benzophenonetetracarboxylic dianhydride. Concerning the diamine, the diamine group should be as high as possible in an electron donative power. Thus, useful ones are those which contain such groups as biphenyl, p-,p-substituted or m-, p-substituted diaminodiphenyl ether, methylenedianiline, naphthalene, and perylene. Specifically, they include 4,4'- or 3,4'-diaminodiphenyl ether, and para-phenylenediamine. Furthermore, their aromatic rings may contain a nitro group.

Black paste solvents normally used include amide-based polar solvents such as N-methyl-2-pyrolidone, N,N-dimethylacetamide, and N,N-dimethylformamide, lactone-based polar solvents, and dimethylsulfoxide. Lactone-based compounds are defined as aliphatic cyclic esters with 3–12 carbon atoms, and specifically they include β-propiolactone, γ-butyrolactone, γ-valerolactone, δ-valerolactone, γ-caprolactone, and ε-caprolactone. In particular, γ-butyrolactone is desirably in terms of the solubility of polyimide precursors.

At least an amide-based polar solvent should be included in terms of the enhancement of the dispersion of carbon black. Preferably, a solvent that consists mainly of an amide-based polar solvent or that is made up only of an amide-based polar solvent should be used. A solvent that consists mainly of an amide-based polar solvent as referred to herein is defined as a solvent mixture consisting of n kinds of solvents with the amide-based polar solvent accounting or more than (1/n) 100 wt. %. In the case of a binary solvent mixture, for example, the amide-based polar solvent must account for more than 50 wt. %, and in the case of a ternary solvent mixture, the amide-based polar solvent must account for more than 33 wt. %. On the other hand, at least a lactone-based polar solvent should be included in terms of the enhancement of the dispersion of additive complementary pigments. Further, a solvent that consists mainly of a lactone-based polar solvent or that is made up only of a lactone-based polar solvent should preferably be used. Wherein, a rosin resin acid can serve effectively when used as dispersant. For a black matrix of the present invention, therefore, the use of a mixture of an amide-based polar solvent and a lactone-based polar solvent is the most desirable. Concerning other solvents, it is preferable to use a solvent with a relatively high vapor rate, such as methyl cellosolve, ethyl cellosolve, methyl carbitol, ethyl carbitol, or ethyl lactate, up to 5–30 wt. % of the total solvent mixture.

Methods for dispersing carbon black or light shading agents, including pigment of additive complementary color to the carbon black, include the use of dispersing equipment, such as three-roll mill, sand grinder, and ball mill, in which the polyimide precursor solution containing a light shading agent and a dispersant are subjected to dispersing treatment. In a preferable method, the carbon black and the pigments of additive complementary color to the carbon black are dispersed separately in respective optimum solvents, followed by the mixing of said solvents. In a more desirable method, which serves to prevent the viscosity increase and gelation that may be caused by reactions among polyimide precursors or between light shading agents and polyimide precursors in the solvent, the light shading agents is added to the solvent to perform pre-dispersion, and the polyimide precursors are then added, followed by post-dispersion or mixing treatment. The degree of dispersion and dispersion time should be controlled appropriately to ensure sufficient fine dispersion of the light shading agents.

Black paste may contain various additives to enhance the dispersion. Rosin resin acids are preferable as a dispersant to disperse additive complementary color pigments. The rosin resin acids include such resin acids as palustric acid, abietic acid, dehydroabietic acid, neoabietic acid, pimaric acid, sandaracopimaric acid, isopimaric acid, elliotionic acid, dehydroagathic acid, and mixtures thereof. They may be hydrogenated. Of these, abietic acid is particularly desirable. Other additives may be used to enhance the coating properties, leveling properties, etc.

In terms of rheology, black paste should preferably be 0.1 Pa or less, more desirably 0.01 Pa or less, still more desirably 0.001 Pa or less, in yield value as determined by the Casson's flow equation. A larger yield value is not desirable because it may cause reduced dispersion, hence aggregation of light shading agents, leading to deterioration in the light shading performance of the black matrix. The flow equation is in the form of Formula 1 below, where S denotes the shear stress, D the shear rate, γo the yield value, and μo the Casson's viscosity. The yield value is determined from the square of the intercept of the $S^{1/2}$-$D^{1/2}$ curve on the $S^{1/2}$ axis.

$$\sqrt{S} = \sqrt{\tau_o} + \sqrt{\mu_o} \cdot \sqrt{D} \qquad \text{[Formula 1]}$$

The viscosity, which may be adjusted appropriately to fit the coating method used, should preferably be 5–1,000 cP, more desirably 8–150 cP, still more desirably 10–100 cP.

An example of a method to produce a black matrix is described below. First, a black matrix consisting of resin containing a dispersed light shading agent is formed on a transparent substrate. For example, a light shading agent is dispersed in a polyimide precursor solution to form black paste, which is then used to coat a transparent substrate. Desirable coating methods include dipping, and other rotating methods such as the use of a roll coater, a whirler, or a spinner. After this, an air heating oven, hot plate, etc., is used for drying and semi-curing. Slightly depending on the kind and coating amount of the polyimide, the semi-curing conditions normally include heating at 100°–180° C. for 1–60 minutes. When a non-photosensitive polyimide precursor is used, for example, the coating process is followed by the coating with photo resist, pre-baking, light exposure using an optical mask, and development. Useful liquid developers include inorganic alkaline solutions such as NaOH and KOH, and organic amine solutions such as tetramethylammoniumhydroxide, and useful developing methods include dipping, showering, and paddling. After continuously performing the development of the resist and the patterning of the black matrix, the resist is removed. When novolac resist is used, for example, useful removal agents include ketones such as acetone, cellosolves such as ethyl cellosolve, and cellosolve acetate, and useful removal methods include dipping, showering, and paddling. Openings normally of 20–200 μm are provided in a black matrix, and pixels will be formed in these openings in a later process.

Next, pixels of several colors are formed in the openings in the black matrix. Normally, pixels are formed after precise alignment to the position of openings. Depending on the type of light exposure equipment and developing conditions, the accuracy of alignment is normally 2–10μm, and therefore, pixels larger than the alignment accuracy are formed on the black matrix with some overlap. Normally, each pixel has one of the three colors of red, blue, and green, and is colored with a coloring agent. Useful coloring agents to color these pixels include organic pigments, inorganic pigments, and dyes. Various additives such as ultraviolet absorbing agent, dispersant, and leveling agent, may be added to these coloring agents. Useful organic pigments include those produced from phthalocyanines, azo lakes, condensed azo compounds, quinacridons, anthraquinones, perylenes, and perinones. Resins used for pixels include photosensitive or non-photosensitive resins such as epoxy, acrylic, polyimide, urethane, polyester, polyvinyl, as well as gelatin and other dyeable animal protein resins. These resins should preferably colored by dispersing or dissolving coloring agents in them, or dyed with such agents. Useful photosensitive resins include photolytic ones, photocrosslinkable ones, and photo-polymerizable ones. Particularly desirable ones include photosensitive compositions that consist of a monomer, oligomer, or polymer having ethylene-type unsaturated bonds and an initiator that generates radicals when exposed to ultraviolet light and photosensitive polyimide precursors. Their film thickness should preferably be in the range of 0.5–3 μm.

Known methods can be used to disperse or dissolve coloring agents. A coloring agent added to the solvent may be dispersed in a dispersing apparatus such as a ball mill, or dissolved in a stirrer apparatus. Useful coating methods include dipping, and other rotating methods such as the use of a roll coater, a whirler, or a spinner. Of these, such rotating methods as dipping, whirling, and spinning, are particularly desirable because the coating thickens of the pixel forming solution is tend to be uniform over the substrate during coating process, leading to the formation of pixels with a uniform thickness.

After this, drying is performed by means of an air heating oven, hot plate, etc., to form a colored layer of the first color over the entire surface of the black matrix. A color filter normally contains plural number of colors, and therefore, unnecessary portions are removed by photolithography to produce the required pixel pattern of the first color. Such unnecessary portions include those for additional pixels that will be formed later, and pixel-free peripheral portions of the substrate. If the colored layer is photosensitive, light exposure is performed using an optical mask, and unnecessary portions are removed by development to form a pixel pattern. If the colored layer is non-photosensitive, the substrate is coated with resist, and light exposure is performed using an optical mask, followed by development. Then, the patterned resist is used as a mask to remove unnecessary portions by etching, followed by the removal of the resist to complete the pixel pattern. This process is performed repeatedly for each of the colors, allowing pixels of plural number of colors to be produced, resulting in the formation of a color filter.

In another method, which is called back exposure, patterned pixels are previously formed over a transparent substrate, which is then coated with photosensitive black paste, followed by light exposure from the transparent substrate side to form a black matrix between pixels using the pixels as mask.

After this, protection film (over coat layer) may be provided as required. There are no specific limitations on the protection film, but useful film materials include acrylic resin, epoxy resin, silicone resin, and polyimide resin. To enhance the quality of the liquid crystal display device, the thickness of the protection film should preferably be 20 μm or less with the height difference over the surface of the protection film preferably being 0.5 μm or less, more desirably 0.3 μm or less, still more desirably 0.2 or less. The height difference over the surface of the protection-film referred to herein is defined as the maximum difference in height between the lowest part of a pixel formed in an opening in the black matrix and the highest part of an adjacent pixel formed on top of the black matrix.

Finally, an ITO transparent electrode may be provided, or patterning may be performed, as required, by known methods.

A resin black matrix for liquid crystal display device of the present invention may be provided on the substrate, instead of being provided on the color filter of the liquid crystal display device. For example, it may be provided on the TFT matrix array substrate in the case of a TFT-LCD, on the MIM matrix array substrate in the case of a MIM-LCD, or on the opposite stripe-like electrode substrate in the case of a STN-LCD.

An example of a method to produce a liquid crystal display device that has a color filter provided with a resin black matrix prepared as described above is as follows: liquid crystal alignment layer is formed on a color filter and subjected to rubbing treatment, and another sheet of alignment layer is formed in the same way on the counter electrodes, subjected to rubbing treatment, and combined with, followed by injection of liquid crystal between the electrodes and assembling of liquid crystal cells to provide a color liquid crystal display device that has a color filter as described above in the liquid crystal cells.

As compared with other black matrices, the black matrix in a liquid crystal display device produced as described above is low in reflectance and its color is neutral black, leading to the following good properties:

(1) High contrast of the display is achieved even in a bright place (high visibility).
(2) The colors of red, green, and blue are vivid.
(3) A natural black color is achieved.
(4) The reflection of surrounding fixtures etc. is small.
(5) The reflection is not tinted.

BEST EMBODIMENTS OF THE INVENTION

To further illustrate of this invention, and not by way of limitation, the following examples are given.
<Preparation of polyamic acid solution>

First, 140.9 g of 3,3',4,4'-biphenyltetracarboxylic dianhydride and 775 g of N-methyl-2- pyrolidone were poured in a container, and 95.10 g of 4,4'-diaminodiphenyl ether and 6.20 g of bis(3-aminopropyl)tetramethyldisiloxane were added and reacted at 60° C. for 3 hours to produce a polyamic acid solution with a viscosity of 600 poise (25° C.). It was about 27 in average degree of polymerization, and had amine end groups at each chain. A non-alkali glass substrate (OA-2, supplied by Nippon Denki Glass, Co., Ltd.) was coated with this solution with a spinner up to a finished thickness of 2 μm, and subjected to hot air drying at 80° C. for 10 minutes, semi-curing at 120° C. for 20 minutes, and curing at 300° C. for 30 minutes. The reference color stimuli, Y, of the resultant polyimide film was 95.

EXAMPLE 1

Carbon black paste and blue pigment paste having the composition listed below subjected to dispersion treatment in a homogenizer at 7000 rpm for 30 minutes, and then mixed, followed by removal of glass beads by filtering to prepare black paste. The black paste has a viscosity of 36 cp and yielding value of 6.9 $10^{-4}$ Pa. Brown-colored carbon black was used as light shading agent in combination with a pigment of additive complementary color of blue.

| Carbon black mill base | |
| --- | --- |
| carbon black (average primary diameter 32 nm, average secondary diameter 60 nm, furnace black) | 4.6 parts |
| polyimide precursor solution | 23.0 parts |
| N-methyl pyrolidone | 61.4 parts |
| glass beads | 90.0 parts |
| Blue pigment mill base | |
| Pigment Blue 15 (Lionol Blue ES, supplied by Toyo Ink Mfg. Co., Ltd.) | 2.2 parts |
| polyimide precursor solution | 23.0 parts |
| abietic acid | 0.2 parts |
| γ-butyrolactone | 63.6 parts |
| glass beads | 90.0 parts |

A non-alkali glass substrate (OA-2, supplied by Nippon Denki Glass, Co., Ltd.) was coated with the black paste with a spinner, and subjected to hot air drying at 80° C. for 10 minutes, and semi-curing at 120° C. for 20 minutes. It was then coated with positive resist (Shipley "Microposit" RC100, 30 cp) with a spinner, and dried at 80° C. for 20 minutes. It was then exposed, through a photomask, to light by means of a light exposure apparatus, PLA-501F supplied by Canon Inc., and the development of the positive resist and the etching of the polyimide precursor were performed simultaneously by using an alkaline liquid developer (Shipley "Microposit" 351), followed by removal of the positive resist using methylcellosolve acetate. It was then cured at 300° C. for 30 minutes to form a 0.98 μm-thick lattice black matrix with openings that are 240 μm long in the longitudinal direction and 60 μm wide in the lateral direction.

A dianthraquinone pigment conformable to Color Index No.65300 Pigment Red 177, a copper phthalocyanine green pigment conformable to Color Index No.74265 Pigment Green 36, and a copper phthalocyanine blue conformable to Color Index No.74160 Pigment Blue 15, were prepared for use as red, green, and blue pigments, respectively. Each of said pigments was added to the polyimide precursor solution described below, followed by mixing to produce three colored pastes of red, green, and blue. The black matrix side of a transparent glass substrate was then coated with the green paste, and subjected to hot air drying at 80° C. for 10 minutes and semi-curing at 120° C. for 20 minutes. Following this, it was coated with positive resist (Shipley "Microposit" RC 100, 30 cp) with a spinner, and dried at 80° C. for 20 minutes. Light exposure was performed using a mask, and the development of the positive resist and the etching of the polyimide precursor were performed simultaneously by using an alkaline liquid developer (Shipley "Microposit" 351), followed by removal of the positive resist using methylcellosolve acetate to form longitudinally extended stripe-shaped green pixels with a width of about 90 μm arranged in parallel at lateral intervals of 300 μm, which were further cured at 300° C. for 30 minutes. The thickness of the pixel layer was 1.5 μm. After rinsing with water, red and blue stripe-shaped pixels were formed in a similar way so that the pixels of the three colors were arranged at intervals of 10 μm.

Then, protection film was formed on top of the pixels and black matrix. To produce the protection film, Methyltrimethoxysilane was hydrolyzed with acetic acid to produce an organosilane condensate. Elsewhere, 3,3',4,4'-benzophenonetetracarboxylic dianhydride and 3-aminopropyltriethoxysilane were mixed at a molar ratio of 1:2 in a n-methyl-2-pyrolidone solvent, and reacted to produce a condensate with an imide group. Said organosilane mixture, said condensate with an imide group, and n-methyl-2-pyrolidone were mixed at a weight ratio of 5:2:4 to form a composition, which was used to coat the substrate with red, blue, and green organic layers provided on it, followed by curing to produce 3.0 $\mu$m-thick protection film of polyimide-modified silicone polymer.

The light shading performance of the black matrix was little dependent on the wavelength, and was 2.5–2.8 (optical density/$\mu$m) at wavelengths of 430–640 nm. The reference color stimuli, Y, at wavelengths of 400–700 was 0.40. The maximum surface height difference over the protection film was 0.48 $\mu$m. This color filter was then provided with ITO transparent electrodes, alignment layer, etc., and a liquid crystal display device was mounted. A trichromatic fluorescent lamp with peaks at the wavelengths of 450 nm, 540 nm, and 610 nm was used for backlighting. The chromaticity of the light coming directly from the backlight source and that through the black matrix was measured with a spectrophotometer (MCPD-1000, supplied by Otsuka Electronics Co., Ltd.). Results are shown in Table 1. Measurements of the optical transmissions through the black matrix at each dominant wavelength of the backlight and their maximum-minimum ratio are shown in Table 2. The liquid crystal display device was high in color reproduction performance even in a low-brightness displaying mode, free of any displaying defects, and high in image quality.

EXAMPLE 2

Carbon black mill base, violet pigment mill base, and blue pigment mill base having the composition listed below were separately subjected to dispersion treatment in a homogenizer at 7000 rpm for 30 minutes, and then mixed, followed by removal of glass beads by filtering to prepare black paste. The black paste has a viscosity of 40 cp and yielding value of 5.8 $10^{-3}$ Pa. Brown-colored carbon black was used as light shading agent in combination with pigments of additive complementary colors of blue and violet.

| Carbon black mill base | |
| --- | --- |
| carbon black (average primary diameter 32 nm, average secondary diameter 60 nm, furnace black) | 2.3 parts |
| polyimide precursor solution | 8.0 parts |
| N-methyl pyrolidone | 61.2 parts |
| glass beads | 71.5 parts |
| Violet pigment mill base | |
| Pigment Violet 23 (Sumitone Fast Violet RL-GP, supplied by Sumitomo Co., Ltd.) | 0.3 parts |
| polyimide precursor solution | 1.2 parts |
| γ-butyrolactone | 2.2 parts |
| glass beads | 3.7 parts |
| Blue pigment mill base | |
| Pigment Blue 15 (Lionol Blue ES, supplied by Toyo Ink Mfg. Co., Ltd.) | 1.1 parts |
| abietic acid | 0.1 parts |
| polyimide precursor solution | 4.9 parts |
| γ-butyrolactone | 8.8 parts |
| glass beads | 14.9 parts |

A color filter was produced as described below by the same way as in Example 1 except that the thickness of the black matrix was 0.75 $\mu$m. The light shading performance of the black matrix was little dependent on the wavelength, and was 3.1–3.4 (optical density/$\mu$m) at wavelengths of 430–640 nm. The reference color stimuli, Y, at wavelengths of 400–700 was 0.32. The maximum surface height difference over the protection film was 0.29 $\mu$m. This color filter was then provided with ITO transparent electrodes, alignment layer, etc., and a liquid crystal display device was mounted. A trichromatic fluorescent lamp with peaks at the wavelengths of 450 nm, 540 nm, and 610 nm was used for backlighting. The chromaticity of the light coming directly from the backlight source and that through the black matrix was measured with a spectrophotometer (MCPD-1000, supplied by Otsuka Electronics Co., Ltd.). Results are shown in Table 1. Measurements of the optical transmissions through the black matrix at each dominant wavelength of the backlight and their maximum-minimum ratio are shown in Table 2. The liquid crystal display device was high in color reproduction performance even in a low-brightness displaying mode, free of any displaying defects, and high in image quality.

EXAMPLE 3

Carbon black mill base(, violet pigment mill base, and blue pigment mill base having the composition listed below were separately subjected to dispersion treatment in a homogenizer at 7000 rpm for 30 minutes, and then mixed, followed by removal of glass beads by filtering to prepare black paste. The black paste has a Viscosity of 50 cp and yielding value of 8.5 $10^{-3}$ Pa. Brown-colored carbon black was used as light shading agent in combination with pigments of additive complementary colors of blue and violet.

| Carbon black mill base | |
| --- | --- |
| carbon black (average primary diameter 32 nm, average secondary diameter 60 nm, furnace black) | 2.3 parts |
| polyimide precursor solution | 6.6 parts |
| N-methyl pyrolidone | 61.2 parts |
| glass beads | 71.5 parts |
| Violet pigment mill base | |
| Pigment Violet 23 (Sumitone Fast Violet RL-GP, supplied by Sumitomo Co., Ltd.) | 0.3 parts |
| polyimide precursor solution | 1.0 parts |
| γ-butyrolactone | 2.2 parts |
| glass beads | 3.7 parts |
| Blue pigment mill base | |
| Pigment Blue 15 (Lionol Blue ES, supplied by Toyo Ink Mfg. Co., Ltd.) | 1.1 parts |
| abietic acid | 0.1 parts |
| polyimide precursor solution | 4.0 parts |
| γ-butyrolactone | 8.8 parts |
| glass beads | 14.9 parts |

A color filter was produced as described below by the same way as in Example 1 except that the thickness of the black matrix was 0.66 $\mu$m. The light shading performance of the black matrix was little dependent on the wavelength, and was 3.5–3.8 (optical density/μm) at wavelengths of 430–640 nm. The reference color stimuli, Y, at wavelengths of 400–700 was 0.33. The maximum surface height difference over the protection film was 0.24 μm. This color filter was then provided with ITO transparent electrodes, alignment layer, etc., and a liquid crystal display device was mounted. A trichromatic fluorescent lamp with peaks at the wavelengths of 450 nm, 540 nm, and 610 nm was used for backlighting. The chromaticity of the light coming directly from the backlight source and that through the black matrix was measured with a spectrophotometer (MCPD-1000, supplied by Otsuka Electronics Co., Ltd.). Results are shown in Table 1. Measurements of the optical transmissions through the black matrix at each dominant wavelength of the backlight and their maximum-minimum ratio are shown in Table 2. The liquid crystal display device was high in color reproduction performance even in a low-brightness displaying mode, free of any displaying defects, and high in image quality.

EXAMPLE 4

A color filter was produced by the same way as in Example 1 except that the thickness of the black matrix was 0.95 μm. The light shading performance of the black matrix was little dependent on the wavelength, and was 3.5–3.8 (optical density/μm) at wavelengths of 430–640 nm. The reference color stimuli, Y, at wavelengths of 400–700 was 0.25. The maximum surface height difference over the protection film was 0.48 μm. This color filter was then provided with ITO transparent electrodes, alignment layer, etc., and a liquid crystal display device was mounted. A trichromatic fluorescent lamp with peaks at the wavelengths of 450 nm, 540 nm, and 610 nm was used for backlighting. The chromaticity of the light coming directly from the backlight source and that through the black matrix was measured with a spectrophotometer (MCPD-1000, supplied by Otsuka Electronics Co., Ltd.). Results are shown in Table 1. Measurements of the optical transmissions through the black matrix at each dominant wavelength of the backlight and their maximum-minimum ratio are shown in Table 2. The liquid crystal display device was high in color reproduction performance even in a low-brightness displaying mode, free of any displaying defects, and high in image quality.

Comparative Example 1

A solution having the composition listed below was subjected to dispersion treatment in a homogenizer at 7000 rpm for 30 minutes, followed by removal of glass beads by filtering. Only carbon black was used as/light shading agent.

| | |
|---|---|
| carbon black | 4.6 parts |
| (MA100, supplied by Mitsubishi Kasei Corp.) | |
| polyimide precursor solution | 57.2 parts |
| N-methyl pyrolidone | 127.4 parts |
| glass beads | 180.0 parts |

A color filter was produced by the same way as in Example 1 except that the thickness of the black matrix was 1.4 μm. The light shading performance of the black matrix was strongly dependent on the wavelength, and was poorer at longer wavelengths. The light shading performance of the black matrix was 1.6–2.5 (optical density/μm) at wavelengths of 430–640 nm. This color filter was then provided with ITO transparent electrodes, alignment layer, etc., and a liquid crystal display device was mounted. A trichromatic fluorescent lamp with peaks at the wavelengths of 450 nm, 540 nm, and 610 nm was used for backlighting. The chromaticity of the light coming directly from the backlight source and that through the black matrix was measured with a spectrophotometer (MCPD-1000, supplied by Otsuka Electronics Co., Ltd.). Results are shown in Table 1. Measurements of the optical transmissions through the black matrix at each dominant wavelength of the backlight and their maximum-minimum ratio are shown in Table 2. The chromaticity coordinates of light generated by a source C and transmitted through black matrixes and the values of $(x-x_o)^2+(y-y_o)^2$ are shown in Table 3. The displayed color tones of the liquid crystal display device was slightly reddish when the brightness is low, and had some defects, leading to poor image quality.

TABLE 1

| | Backlight | | Black matrix | | $(x - x_o)^2 +$ |
|---|---|---|---|---|---|
| | $X_o$ | $y_o$ | x | y | $(y - y_o)^2$ |
| Example 1 | 0.34 | 0.37 | 0.35 | 0.42 | 0.0026 |
| Example 2 | 0.34 | 0.37 | 0.36 | 0.36 | 0.0005 |
| Example 3 | 0.34 | 0.37 | 0.36 | 0.36 | 0.0005 |
| Example 4 | 0.34 | 0.37 | 0.37 | 0.37 | 0.0009 |
| Comp. example 1 | 0.34 | 0.37 | 0.49 | 0.44 | 0.027 |

TABLE 2

| | Transmission (%) at dominant wavelengths (nm) of backlight | | | Transmission ratio |
|---|---|---|---|---|
| | 440–460 | 530–560 | 600–620 | (max/min) |
| Example 1 | 0.25 | 0.44 | 0.23 | 1.9 |
| Example 2 | 0.32 | 0.32 | 0.38 | 1.2 |
| Example 3 | 0.32 | 0.32 | 0.38 | 1.2 |
| Example 4 | 0.025 | 0.025 | 0.033 | 1.3 |
| Comp. example 1 | 0.048 | 0.23 | 0.43 | 9.0 |

TABLE 3

| | C source | | Black matrix | | $(x - x_o)^2 +$ |
|---|---|---|---|---|---|
| | $X_o$ | $y_o$ | x | y | $(y - y_o)^2$ |
| Example 1 | 0.31 | 0.32 | 0.32 | 0.37 | 0.003 |
| Example 2 | 0.31 | 0.32 | 0.30 | 0.31 | 0.000 |
| Example 3 | 0.31 | 0.32 | 0.30 | 0.31 | 0.000 |
| Example 4 | 0.31 | 0.32 | 0.29 | 0.30 | 0.001 |
| Comp. example 1 | 0.31 | 0.32 | 0.50 | 0.42 | 0.046 |

Measurements were made to determine the interior illuminance dependence of the contrast ratio (visibility; normally defined as white brightness/black brightness, but when reflected light exists, it is defined as (white brightness+reflection)/(black brightness+reflection)) of a liquid crystal display device (thin film transistor, or TFT, type) that has a color filter provided with a resin black matrix prepared as described above, and other devices of chrome black matrix type and two-layer chrome black matrix type, as well as a color CRT for comparison. The brightness was measured using Topcon Black Matrix 5 or Black Matrix 7. Results have shown that the liquid crystal display device that has a color filter provided with a resin black matrix does not suffer a large decrease in contrast ratio even when the interior illuminance is high, indicating that its visibility is high even in a bright place. Major perceived features of a liquid crystal display device that has a resin black matrix color filter are as follows:

(1) The colors of red, green, and blue are vivid.

(2) A natural black color is achieved.

(3) The reflection of surrounding fixtures etc. is small.

(4) The reflection is not tinted.

A survey was made on 100 test users. Results statistically proved the features of the liquid crystal display device that has a resin black matrix color filter.

The present invention provides a method wherein a specific light shading agent is dispersed in resin as described above to produce a color filter for liquid crystal display device that has good color characteristics, said color filter serving to produce display devices with high displaying quality.

We claim:

1. A resin black matrix for a liquid crystal display device which contains dispersed light shading agents and has a backlighting source, wherein the chromaticity coordinates (x, y) in the XYZ color system of the light that is transmitted through the resin black matrix from said backlighting source and the chromaticity coordinates $(x_o, y_o)$ of said light source follow a chromaticity relation of $(x-x_o)^2+(y-y_o)^2 \leq 0.01$.

2. A resin black matrix for a liquid crystal display device comprising dispersed light shading agents, wherein, (i) chromaticity coordinates in the XYZ color system of visible light from a backlight source transmitted through or reflected from said resin black matrix are (x, y), said backlight having chromaticity coordinates $(x_o, y_o)$, and (ii) said chromaticity coordinates (x, y) and $(x_o, y_o)$ follow a chromaticity relation of $(x-x_o)^2+(y-y_o)^2 \leq 0.01$.

3. A resin black matrix for liquid crystal display device as specified in claim 1 or 2 wherein the backlighting source is a trichromatic light source and the maximum value of the optical transmissions through the black matrix at the respective dominant wavelength being not greater than the four times of the minimum value thereof.

4. A resin black matrix for liquid crystal display device as specified in claim 1 or 2 which contains, as light shading agents, carbon black and pigments of additive complementary color to said carbon black.

5. A resin black matrix for liquid crystal display device as specified in claim 4 wherein said pigments of additive complementary color to said carbon black are blue and/or violet organic pigment.

6. A resin black matrix for liquid crystal display device as specified in claim 4 wherein the content of said carbon black in said light shading agent is 50 wt. % or more.

7. A resin black matrix for liquid crystal display device as specified in claim 4 wherein the average diameter of the secondary particles of said carbon black is in the range of 6–75 nm.

8. A resin black matrix for liquid crystal display device as specified in claim 1 or 2 wherein the optical density per 1 μm thickness of said black matrix is 2.3 or more in the visible light wavelength range of 430–640 nm.

9. A resin black matrix for liquid crystal display device as specified in claim 1 or 2 wherein said resin is polyimide resin.

10. A resin black matrix for liquid crystal display device as specified in claim 9 wherein said polyimide resin has a reference color stimuli, Y, in the XYZ color system, of 96 or less per 2 μm thickness of said polyimide film.

11. A resin black matrix for liquid crystal display device as specified in claim 9 wherein said resin black matrix is produced by coating a transparent substrate with black paste that comprises carbon black and pigments of additive complementary color to said carbon black, said carbon black and said pigment being dispersed in a polyimide precursor solution containing a rosin resin acid.

12. A color filter which has a resin black matrix for liquid crystal display device as specified in claim 1 or 2.

13. A liquid crystal display device which is provided with a color filter as specified in claim 12.

14. A resin black matrix for a liquid crystal display device according to claim 1 or 2, wherein said resin black matrix for said liquid crystal display is formed from a non-photosensitive resin.

15. A resin black matrix for a liquid crystal display device according to claim 1 or 2, wherein said resin black matrix for said liquid crystal display is formed from a non-photosensitive polyimide resin.

16. A process for manufacturing a resin black matrix for a liquid crystal display device comprising dispersed light shading agents, wherein in said resin black matrix for said liquid crystal device, (i) chromaticity coordinates in the XYZ color system of visible light from a backlight source transmitted through or reflected from said resin black matrix are (x, y), said backlight having chromaticity coordinates $(x_o, y_o)$, and (ii) said chromaticity coordinates (x, y) and $(x_o, y_o)$ follow a chromaticity relation of $(x-x_o)^2+(y-y_o)^2 \leq 0.01$, comprising the steps of:

(a) forming a black resin film on a transparent substrate;

(b) patterning said black resin film by exposure to light transmitted through a photo-mask to form a patterned black resin film;

(c) developing said patterned black resin film to form a developed, patterned black resin film; and (d) curing said developed, patterned black resin film, to produce said resin black matrix for said liquid crystal device that satisfies said chromaticity relation of $(x-x_o)^2+(y-y_o)^2 \leq 0.01$.

17. A process for manufacturing a resin black matrix for a liquid crystal display device comprising dispersed light shading agents, wherein in said resin black matrix for said liquid crystal device, (i) chromaticity coordinates in the XYZ color system of visible light from a backlight source transmitted through or reflected from said resin black matrix are (x, y), said backlight having chromaticity coordinates $(x_o, y_o)$, and (ii) said chromaticity coordinates (x, y) and $(x_o, y_o)$ follow a chromaticity relation of $(x-x_o)^2+(y-y_o)^2 \leq 0.01$, comprising the steps of:

(a) forming a non-photosensitive black resin film on a transparent substrate;

(b) forming a photo-resist film onto said non-photosensitive black resin film;

(c) patterning said photo-resist film and said non-photosensitive black resin film by exposure to light transmitted through a photo-mask to form a patterned black resin layer comprising a patterned photo-resist film and a patterned non-photosensitive black resin film;

(d) developing said patterned black resin layer to form a developed, patterned black resin layer comprising a developed, patterned photo-resist film and a developed, patterned non-photosensitive black resin film;

(e) removing said developed, patterned photo-resist layer from said developed, patterned black resin layer; and (f) curing said developed, patterned non-photosensitive black resin film, to produce said resin black matrix for said liquid crystal device that satisfies said chromaticity relation of $(x-x_o)^2+(y-y_o)^2 \leq 0.01$.

18. A process for manufacturing a resin black matrix for a liquid crystal display device according to claim 17, wherein said resin black matrix for said liquid crystal display device further comprises an optical density per 1 $\mu$m thickness of 2.3 or more in visible light having a wavelength of 430–640 nm.

* * * * *